Oct. 5, 1965   D. BIDERMAN   3,209,397
SAUSAGE LINKING MACHINES
Filed Aug. 12, 1963   3 Sheets-Sheet 1

INVENTOR.
DAVID BIDERMAN
BY
B. T. Wolbensmith
ATTORNEY

Oct. 5, 1965    D. BIDERMAN    3,209,397
SAUSAGE LINKING MACHINES
Filed Aug. 12, 1963    3 Sheets-Sheet 2
FIG.3
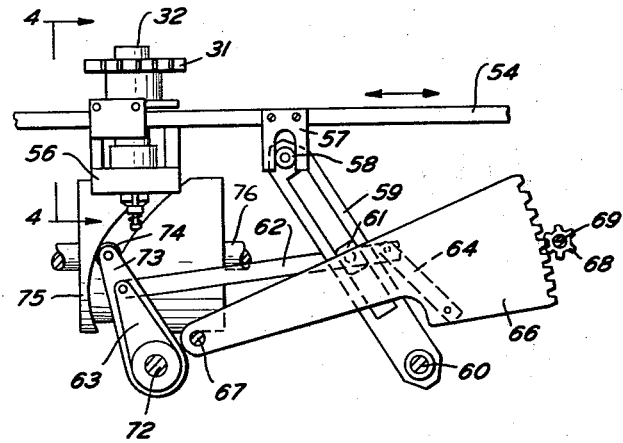
FIG.4
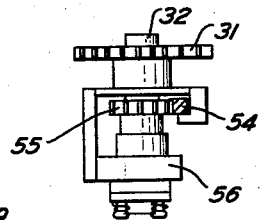
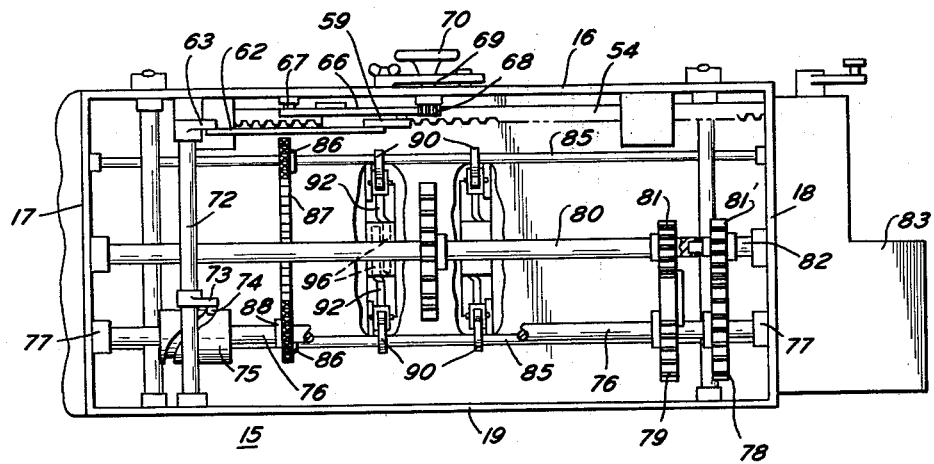
FIG.5
INVENTOR.
DAVID BIDERMAN
BY
ATTORNEY Oct. 5, 1965 D. BIDERMAN 3,209,397
SAUSAGE LINKING MACHINES
Filed Aug. 12, 1963 3 Sheets-Sheet 3
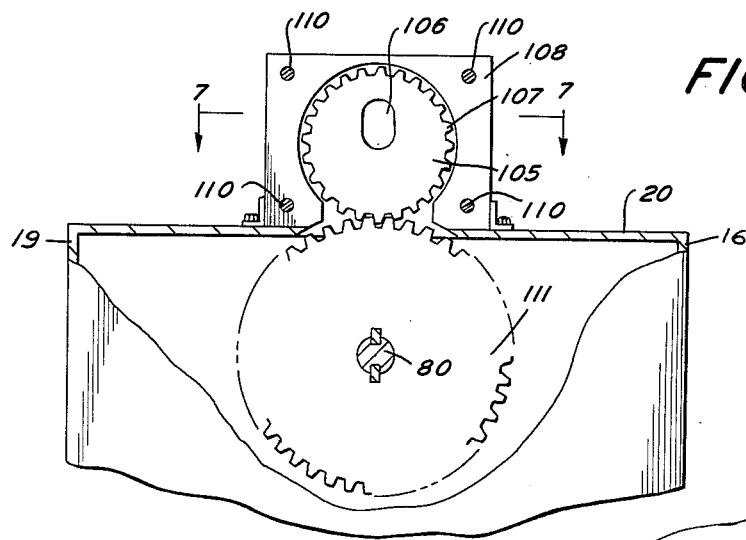
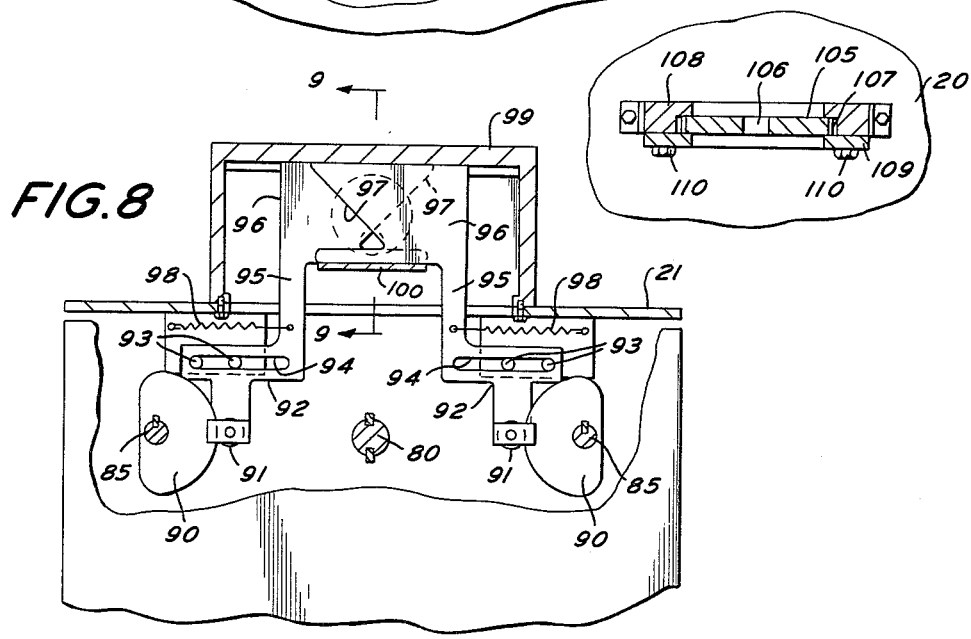
INVENTOR.
DAVID BIDERMAN
BY
*B. T. Wobensmith*
ATTORNEY

United States Patent Office 3,209,397
Patented Oct. 5, 1965

3,209,397
SAUSAGE LINKING MACHINES
David Biderman, 608 Callowhill St., Philadelphia, Pa.
Filed Aug. 12, 1963, Ser. No. 301,259
10 Claims. (Cl. 17—34)

This invention relates to sausage linking machines and more particularly to a machine for linking sausage stuffed in natural casings or casings of animal origin.

It has heretofore been proposed to provide a sausage linking machine in which base plates were provided having advancing and removing conveyors and cord applying mechanism interposed between for surrounding the casing with cords at spaced intervals thereby compressing the casing and forming and retaining spaced links. One such machine is shown in U.S. Patents Nos. 2,307,361, 2,228,075, 2,252,670, 2,258,644, 2,271,795, 2,282,945. This type of machine, while satisfactory for synthetic casings, results in frequent failures with natural casings because of rupture of the natural casings. Such rupture requires rethreading of the machine with attendant loss of production time. The use of the cord, also, introduces an inedible constituent which must be removed at the time of use.

It is the principal object of the present invention to provide a sausage linking machine, particularly for sausages stuffed in natural casings, in which the filled casing is pinched at predetermined spaced locations and the casing twisted between the pinched locations to impart a permanent linked construction, the pinched locations providing regions facilitating the turning.

It is a further object of the present invention to provide a sausage linking machine of the character aforesaid with which the lengths of the links can be varied as desired.

It is a further object of the present invention to provide a sausage linking machine which utilizes the curvature of natural casings to facilitate the link formation.

It is a further object of the present invention to provide a sausage linking machine which is readily adapted to different sizes of casings, if desired.

It is a further object of the present invention to provide a sausage linking machine in which the filled casing is intermittently advanced, pinched at predetermined spaced locations, revolved between the spaced pinched locations, and delivered in linked condition, all in predetermined timed relation, and without the necessity for supervision of the linking and advancing operations.

Other objects and advantageous features of the invention will be apparent from the description and claims.

The nature and characteristic features of the invention will be more readily understood from the following description, taken in connection with the accompanying drawings forming part thereof, in which:

FIG. 3 is a fragmentary vertical sectional view taken approximately on the line 3—3 of FIG. 2;

FIG. 4 is a fragmentary sectional view taken approximately on the line 4—4 of FIG. 3;

FIG. 5 is an underneath plan view of the machine shown in FIG. 1, parts being omitted;

FIG. 6 is a transverse vertical sectional view, further enlarged, taken approximately on the line 6—6 of FIG. 1;

FIG. 7 is a horizontal sectional view taken approximately on the line 7—7 of FIG. 6;

FIG. 8 is a vertical sectional view taken approximately on the line 8—8 of FIG. 1; and FIG. 9 is a vertical sectional view taken approximately on the line 9—9 of FIG. 8.

Figure 1:
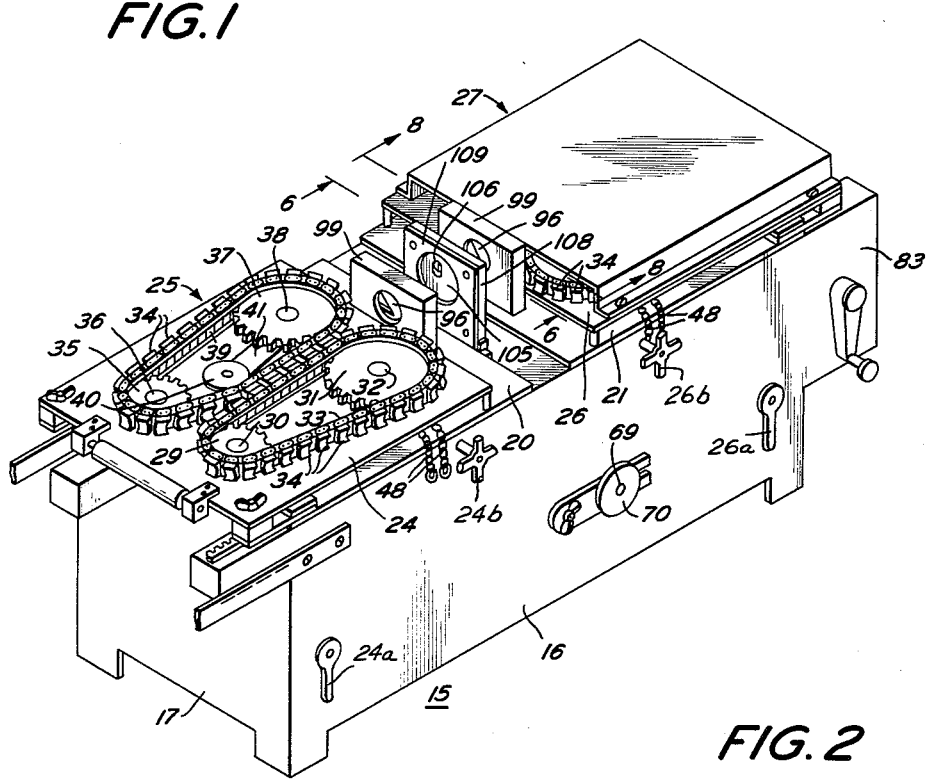
FIG. 1 is a view in perspective of a preferred embodiment of a sausage linking machine in accordance with the invention.
Figure 2:
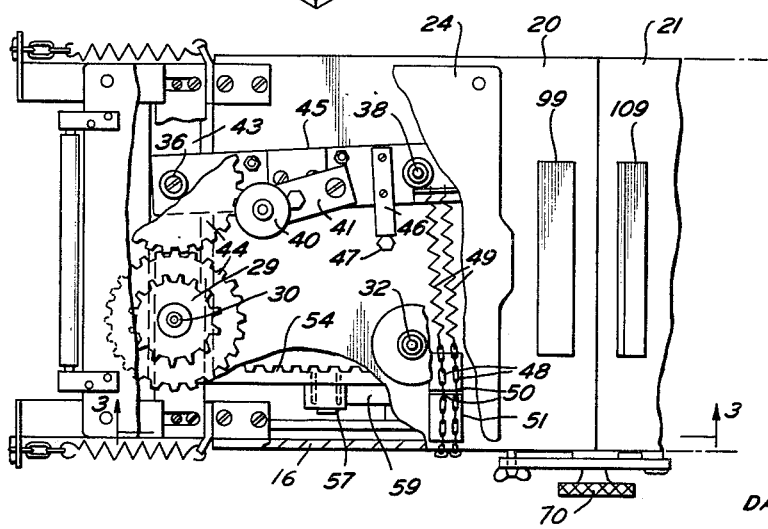
FIG. 2 is a fragmentary plan view enlarged of a portion of the conveyor driving mechanism, parts being broken away to show the details of construction.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the sausage linking machine in accordance with the invention preferably includes a housing 15, which serves as a support for some components and encloses other components of the machine. The housing 15 as illustrated, has a front wall 16, end walls 17 and 18 and a rear wall 19.

Horizontal top plates 20 and 21 are provided, mounted on the top of the housing 15, in a well known manner.

The top plate 20 has a upper mounting plate 24 mounted thereon and adjustably positioned by a handle 24a and locked by a handle 24b. The top plate 20 carries an adjustable supply chain assembly 25 of known type, the operating and adjusting mechanism for which is interposed between the top plate 20 and the upper mounting plate 24.

The top plate 21 has an upper mounting plate 26 mounted thereon and adjustably positioned by a handle 26a and locked by a handle 26b. The top plate 21 carries an adjustable delivery chain assembly 27 of known type, the operating and adjusting mechanism for which is interposed between the top plate 21 and the upper mounting plate 26.

The supply chain assembly 25 and delivery chain assembly 27 are the same in construction, but oppositely disposed so that a detailed description of one should suffice for the other.

The chain assembly 25 includes a front sprocket pinion 29 on a shaft 30, a front sprocket 31 on a shaft 32 and a front chain 33 thereon. The chain 33 can be provided with spaced rubber shoes 34.

The supply chain assembly also includes a rear sprocket pinion 35 on a shaft 36, a rear sprocket 37 on a shaft 38 and a rear chain 39 thereon with which an idler 40 carried on an idler bracket arm 41 is in engagement for retaining the chain 39 at the desired tension and to provide a substantially parallel path with the chain 33. The chain 39 also can be provided with spaced rubber shoes 34.

The shafts 30 and 36 are rotatably mounted on a horizontal shaft supporting bar 43, and are connected for movement together by gears 44. A chain adjusting bar 45 pivotally mounted at one end of the shaft 36, carries the idler bracket arm 41, and the shaft 38 and has a limit stop arm 46 for engagement with a stop pin 47 on the plate 20.

In order to urge the bar 45 forward, adjustment chains 48 having springs 49 connected thereto and to the bar 45 can be hooked in slots 50 in brackets 51 on the plate 20.

The shaft 32 provides the driving force to actuate the chain 33 which through the shaft 30, the gears 44, the shaft 36 and the pinion 35 actuates the rear chain 39 in timed relation with the chain 33.

The shaft 32 is intermittently driven by a rack 54 in engagement with a gear 55 which through a one way clutch 56 drives the shaft 32. The rack 54 also simultaneously drives the delivery chain assembly through the sprocket 31 thereof in a similar manner.

The rack 54 has a fork 57 thereon which is engaged by a roller 58 on a slide arm 59. The slide arm 59 has a pivot pin 60 mounted on the front wall 16 and has a slide block 61 on a link 62 carried thereon. The link 62 at one end is pivoted to a crank arm 63 and at the other end has a link 64 pivoted thereto. The link 64 is pivotally connected to an adjusting sector 66 which is pivotally carried by a pivot pin 67 and has a pinion 68 in engagement therewith. The pinion 68 is on a shaft 69 which is rotated by a hand wheel 70 accessible exteriorly of the front wall 16. The stroke of the rack 54 can be varied by varying the position of the slide block 61 in the slide link 62 by turning of the hand wheel 70, and moving the slide block 61 upon movement of the sector 66, the link 64 and the end of the link 62 to which the link 64 is connected.

The crank arm 63 is secured to a shaft 72, which is mounted on the walls 16 and 19. The shaft 72 has a cam follower arm 73 secured thereto with a cam follower roller 74 thereon. The roller 74 engages with a feed cam 75. The feed cam 75 is mounted on a main shaft 76 which is journalled in bosses 77 on the end walls 17 and 18 and is continuously rotated as hereinafter explained.

The shaft 76 has a driving spur gear 78 keyed thereto and has a multilated gear 79 keyed thereto to provide an intermittent output.

An intermittent shaft 80 is provided, rotatably supported by the end walls 17 and 18, and has an intermittently driven gear 81 thereon engaging the mutilated gear 79 for timed intermittent rotation of the shaft 80.

In order to drive the gear 78 a gear 81 is provided meshing therewith and carried on a stub shaft 82, extending from and rotatable independently of the shaft 80. The stub shaft 82 is driven by an electric motor (not shown) in a motor housing 83 through reduction gears (not shown).

The main shaft 76 and the associated structure just desecribed is known and provides an adjustable linear feed and delivery at predetermined timed intervals.

In accordance with the invention the structure is provided for pinching a filled sausage casing in predetermined timed relation and preferably while the supply chain assembly 25 and delivery chain assembly 27 are coming to rest, and rotating or revolving the casing between the pinched locations while the chain assemblies 25 and 27 are at rest and then retracting the pinching structure to permit of advancing the filled casing for delivery of the twisted links and location of filled casing for further linking.

For this purpose front and rear horizontal pinch control cam shafts 85 are provided having sprockets 86 thereon with a chain 87 engaged therewith and with a sprocket 88 on the main shaft 76.

The shafts 85 each has a cam 90 keyed thereon and movable along its shaft 85 for adjustment of link length, the cam 90 being engaged by a cam follower roller 91 on a pinch control plate 92. The pinch control plates 92 are horizontally slidably mounted on guide pins 93 engaged in slots 94 and have vertically extending arms 95 carrying pinch plates 96 thereon. The pinch plates 96 have oppositely downwardly inclined marginal edges 97 which by horizontal movement provide a restricted opening at the locations of maximum reduction in diameter. The pinch control plates 92 are normally urged to separated condition of the inclined edges 97 and with the rollers 91 held in engagement with the cams 90 by springs 98.

The control plates 92 are enclosed at their tops and sides by a pinch plate housing 99 and a supporting shelf 100 can be provided in the interior to support the filled casing at the location of pinching.

The revolving of the filled sausage casing between the locations thereof which are pinched by the pinch control plates 92 is effected by a casing revolving disc 105 with its center substantially in alignment with the central axis of a filled sausage casing and with an eccentric casing receiving and revolving opening 106. The disc 105 has a toothed periphery 107 and is received in a disc housing 108 having a removable cover plate 109 held by bolts 110. The removal of the cover plate 109 permits of substitution of another disc 105 having a different size of opening 106 for accommodation to different diameters of filled sausage casings.

The toothed periphery 107 of the disc 105 is in engagement with a gear 111 keyed to the intermittent shaft 80.

The mode of operation will now be pointed out.

At the outset a sausage casing is inserted in the supply chain assembly 25, the first set of pinch plates 96, the opening 106 in the disc 105, the second set of pinch plates 96, and the delivery chain assembly 27.

Upon rotation of the driving motor (not shown) and rotation of the stub shaft 82 and the gear 81, the main shaft 76 is continuously rotated by the engagement of the gear 81 with the gear 78.

Rotation of the main shaft 76 is effective for rotating the cam 75 which through the follower roller 74, follower arm 73 and shaft 72, through the crank arm 63, link 62 and slide arm 59 actuates the rack 54. The amplitude of movement of the rack 54 is determined by the setting of the slide block 61.

Movement of the rack 54 in one direction, through the gear 55, the one way clutch 56 and the shaft 32 actuates the supply chain assembly 25 and the delivery chain assembly 27 to advance the casing a predetermined amount, determined by the desired length of link and is such as to make two links at each cycle. The length of the link is determined by the distance between the sets of pinch plates 96. The assemblies 25 and 27 are at rest during the return movement of the rack 54, the one way clutch 56 preventing retrogressive movement.

Rotation of the shaft 76 is also effective through the chain 87 and sprockets 86 and 88 for rotating the cam shafts 85.

The cams 90 are positioned so that while the assemblies 25 and 27 are at rest, or are coming to rest, the pinch control plates 92 are impelled towards each other so that the edges 97 squeeze the casing at spaced locations to provide the desired length of link.

As the pinching of the casing is effected the intermittent shaft 80 is actuated through the drive portion of the mutilated gear 79 and the drive gear 81 to rotate the gear 111. Rotation of the gear 111 by its engagement with the periphery 107 of the disc 105 causes the turning of the disc 105 so that the disc opening 106 swings the casing to twist the same around the locations at which the pinching has been effected and thereby form a link. Upon the completion of this turning, the number of turns being determined by the number of turns of the shaft 80 and the number of turns of the disc 105, the disc 105 comes to rest at its initial location.

Separation of the pinch plate edges 97 by the springs 98 is permitted by advance of the cams 90.

The cycle is then repeated with continuous formation of links in the casing.

The disposition of the opening 106 in the disc 105 acts with the curvature in natural casings to facilitate the link formation.

The apparatus as herein described is particularly suited for accomplishing the objects of the invention.

I claim:

1. A sausage linking machine having
   (a) a main drive shaft,
   (b) a casing supply assembly,
   (c) a casing delivery assembly aligned with said supply assembly,
   (d) members connected to said main drive shaft and to said assemblies for driving said assemblies intermittently with a stop period between driving periods,
   (e) casing pinching members at spaced locations between said supply and delivery assemblies,
   (f) control members for said casing pinching members for moving said members to and from casing pinching positions,
   (g) members interposed between said main drive shaft and said control members for actuating said control members, (h) a casing twisting member interposed between said pinching members,
(i) a second shaft,
(j) driving connections between said second shaft and casing twisting member, and
(k) intermittent driving means interposed between said main drive shaft and said second shaft.

2. A sausage linking machine as defined in claim 1 in which
(a) said casing pinching members include plates movable toward and away from each other.

3. A sausage linking machine as defined in claim 1 in which
(a) said casing pinching members include plates movable toward and away from each other, and
(b) said control members include cams for moving said pinching members during the stop period of said assemblies.

4. A sausage linking machine as defined in claim 1 in which
(a) said casing twisting member is a disc rotatable about an axis transverse thereto, and
(b) said disc has a casing receiving opening therethrough offset from the rotational axis thereof.

5. A sausage linking machine as defined in claim 1 in which
(a) said casing twisting member is a disc, having a toothed periphery,
(b) and said driving connections include a gear on one of said shafts in driving engagement with said toothed periphery.

6. A sausage linking machine as defined in claim 1 in which
(a) said driving connections include portions for rotating said casing twisting member during the stop period of said assemblies.

7. A sausage linking machine as defined in claim 1 in which
(a) said casing pinching members include plates movable toward and away from each other,
(b) said control members include cams for moving said pinching members to pinching positions during the stop period of said assemblies, and
(c) said driving connections include portions for rotating said casing twisting member during the stop period of said assemblies.

8. A sausage linking machine as defined in claim 1 in which
(a) said casing pinching members include plates movable toward and away from each other for simultaneously pinching the casing at spaced locations,
(b) said control members include cams for moving said pinching members to pinching positions during the stop period of said assemblies, and
(c) said driving connections include portions for rotating said twisting member during the stop period of said assemblies and while said pinching plates are in casing engagement.

9. A sausage linking machine comprising a housing, intermittently operated members for advancing a sausage casing along said housing, spaced reciprocatory members carried by said housing interposed between said advancing members for pinching said casing, and a rotatable member carried by said housing interposed between said spaced members for rotating the casing between said spaced members in timed relation to the movement of said advancing members and said spaced members, and said rotatable member being a disc and having a casing receiving opening offset from the center of rotation of the disc.

10. A sausage linking machine as defined in claim 9 in which the periphery of said disc has driving teeth thereon, and a driving member is provided in engagement with said periphery.

References Cited by the Examiner

UNITED STATES PATENTS

| | | | |
|---|---|---|---|
| 1,564,588 | 12/25 | Kruse | 17—34 |
| 2,228,075 | 1/41 | Demarest et al. | 17—34 |
| 2,307,361 | 1/43 | Demarest et al. | 17—34 |
| 2,406,163 | 8/46 | Prohaska | 17—34 |
| 3,054,545 | 9/62 | Karius | 226—172 |

SAMUEL KOREN, *Primary Examiner.*

LUCIE H. LAUDENSLAGER, *Examiner.*